June 24, 1930.  M. HOFFMAN  1,768,063

INDICATOR FOR MOTION PICTURE PROJECTION APPARATUS

Filed March 30, 1927

INVENTOR.
MICHAEL HOFFMAN
BY
ATTORNEY

Patented June 24, 1930

1,768,063

UNITED STATES PATENT OFFICE

MICHAEL HOFFMAN, OF BROOKLYN, NEW YORK

INDICATOR FOR MOTION-PICTURE-PROJECTION APPARATUS

Application filed March 30, 1927. Serial No. 179,524.

This invention relates to the art of motion pictures, and one of the objects thereof is to provide new and improved means, whereby the musical score produced to accompany a screened play or performance, or various acts or scenes, and whereby either the spoken or singing voices of the actors may be more accurately co-related or co-ordinated to the projected play, acts or scenes or parts of a play or performance, than has obtained in devices or machines as hitherto constructed.

Another object of the invention is to provide new and improved means for co-relating or co-ordinating the audible accompaniment to the scenes or acts being portrayed on the screen when music or vocal expressions of actors are being mechanically reproduced.

More particularly, my invention contemplates the provision of means associated with sound reproducing apparatus and preferably located in the booth occupied by the operator of the projecting apparatus, whereby the latter can manipulate the machine so as to more accurately co-ordinate a musical score or vocal expressions to the screened features of the film, than has obtained in machines or devices hitherto constructed.

In my pending application Serial No. 179,523 filed March 30, 1927, and now matured into Patent 1,694,943, Dec. 11, 1928, I have disclosed apparatus of this type, associated with sound reproducing apparatus, wherein the sound is reproduced from a cylinder. In the present invention, I contemplate utilizing apparatus wherein the sound to be reproduced is recorded upon a disk.

Other objects and aims of the invention, more or less specific than those referred to above, will be in part obvious and in part pointed out in the course of the following description of the elements, combinations, arrangements of parts and applications of principles, constituting the invention, and the scope of projection contemplated will be indicated in the appended claim.

In the accompanying drawings, wherein I have illustrated preferred forms of embodiments of my invention, Figure 1 is a top plan view of a preferred form of embodiment of my apparatus;

Before proceeding to describe the structural characteristics of the present form of embodiment of my invention, it may here be noted that in a present employed method of mechanically reproducing an accompanying musical score or vocal expression of actors to a screened play or acts or scenes thereof, the audible expressions whether musical or otherwise, are recorded upon a master cylinder or disk simultaneously with the production of the film, the sound recording apparatus being connected to and operating synchroneously with the projecting apparatus, whereupon when the duplicated sound records are distributed with the film to the various theatres, and are used in similarly constructed and synchroneously operating projecting and sound reproducing apparatus, the screened film and the accompanying audible expressions will be co-related or co-ordinated in the identical manner in which the original music was co-ordinated with the filming of the picture.

In apparatus as at present constructed, the sound reproducing apparatus as hereinbefore indicated, is preferably located in the booth occupied by the operator or operators of the projecting machine and under his or their control, the reproduced sound being preferably amplified by a device located in proximity to the screen.

The mechanism as hitherto constructed, is open to the objection that on frequent occasions, the operator of the projecting machine, is required to subtract or cut out footage from the film, by reason of defective or damaged film length, or from other causes, such as requirements of censorship, or to insert film footage into a reel by reason of change of titles or like causes. This, of course, varies the pre-determined and established relationship between the sound record and the film, whereby the musical score or audible expressions are no longer co-ordinated with the film. Moreover, if for any other reason the relation between the features of the screened picture and the audible accompaniment thereto becomes deranged or destroyed, there has hitherto been no efficient method of re-coordinating the features displayed on the screen with the audible accompaniment during the screening of the picture.

In the mechanism which I shall now proceed to describe, the above and other defects are eliminated, and a device provided whereby the sound reproducing apparatus and the projecting apparatus may be at all times maintained in co-ordinated relation, and whereby if the pre-determined relationship between those instrumentalities is destroyed, such relationship may be quickly and accurately restored.

Figure 1:
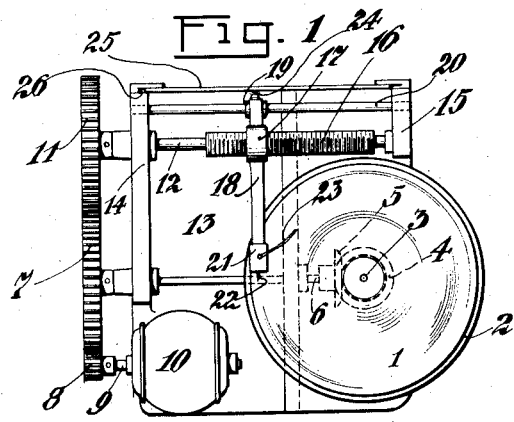
Figure 2:
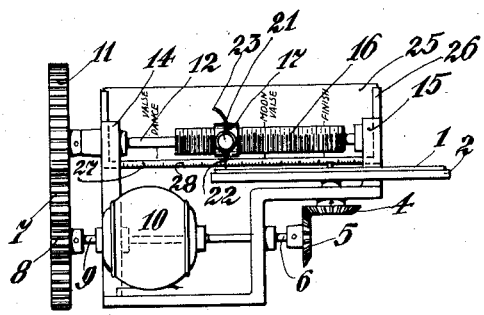
Figure 2 is a front view thereof.

Referring now to the drawings, wherein similar reference characters refer to similar parts throughout the several views thereof, and referring particularly to Figures 1 and 2, the reference numeral 1 denotes, in the present instance, the disk upon which the musical score or audible expression designed for a particular film production has been recorded. This disk, in the present instance, is mounted upon the usual table 2 and centered thereon as by means of the pin 3 which extends upwardly through an aperture of the disk. The table 2 is provided with a bevelled gear 4 driven by a bevelled gear 5 mounted upon the shaft 6. Shaft 6 is provided with a gear 7 driven as by means of a pinion 8 upon the shaft 9 of the motor 10. Gear 7 meshes with and drives a gear 11 mounted upon a shaft 12 suitably journaled in a frame 13, bearings 14 and 15 being provided in said frame for rotatively supporting the shaft 12. Shaft 12 is provided with a screw threaded portion 16, upon which rests a block 17 carried upon the arm 18, said arm 18 having a bearing 19 which is adapted to slide upon a rod 20 disposed in parallel relation with the shaft 12. The outer end of the arm 18 is provided with the usual sound box 21 having the needle 22 which co-operates with the grooves of the disk 1 to reproduce the sound recorded thereon. Leading from the sound box 21 is a cable 23 which is intended to extend to the sound amplifying devices to be located at or near the screen.

Provided upon the rear end of the arm 18 is an indicator 24 which moves lengthwise of a cue chart 25 mounted in grooves provided in a frame 26. This frame is preferably provided with a longitudinally extending rail 27 provided with a scale 28 with which the indicator 24 also cooperates.

It will be seen that when the motor 10 is driving the disk 2, it will also drive the shaft 12, whereby the block 17 of the arm 18 which engages the screw threaded portion 16 of said shaft, will be moved longitudinally thereof, and at the same time the needle 22 will traverse the grooves of the sound record. The relations between the driving means for the sound record and the driving means for the shaft 12 and the grooves of the sound record and the pitch of the threads 16 are such that the block 17 will be moved in a lateral direction at the same speed as the needle 22 moves by reason of its engagement with the grooves of the sound record.

It will be seen that when the arm 18 is swung upwardly upon the rod 20 as a pivot, both the needle 22 and the block 17 will be disengaged from their respective parts, whereby the arm 18 can be moved laterally in either direction by the operator.

It is intended that the sound reproducing apparatus shall be located in the booth of the operator of the projecting apparatus, and under his control, the sound reproduced being amplified by a suitable device located in proximity to the stage or screen as above set forth.

The motor 10 which drives the sound reproducing apparatus, and the indicating means, is intended to be connected with the motor which drives the projecting apparatus (not shown) in such a way that the movement of the film of the projecting machine past the lens, will be synchronized with the sound reproducing apparatus, so that audible expression or musical score will be produced simultaneously with the exhibition of pre-determined pictorial representations on the screen. It is also intended that the indicator 24 will cooperate with the chart 25 to give a visual indication at all times of the pictorial representations being displayed.

It is also intended that the parts shall be so disposed and arranged that the indicator 24 in conjunction with the scale 28 will indicate the length or footage of film being moved past the lens of the projecting apparatus.

Referring now to the chart 25, a similar or preliminary chart is prepared by a skilled observer at the original screening or production of the film together with the production of the audible expressions, sounds or musical score, the latter being recorded on a master disk simultaneously with the production of the picture. This skilled observer viewing the scene to be portrayed and hearing the simultaneously produced aforesaid audible expressions, sounds or musical score, then being recorded, notes on a then blank chart positioned in the sound recording machine, the various features, acts or scenes being enacted, said notations being made at points on the chart directly opposite the indicator 24. In other words, this observer follows the course of the indicator as it travels from left to right across the chart and makes such notations thereon as thereafter can be followed by an operator of the projecting machine.

Having made these notations, a finished chart is then prepared and printed, the final notations thereon maintaining the same relative position as regards the movable indicator as did the initial notations made by the observer.

It will be understood, of course, that finished charts are cut to the exact size of the chart utilized in the production of the film and the accompanying audible expressions, sounds or musical selections, so that when said finished charts are positioned in the frame of another similarly constructed machine, the indicator thereof in its movement along the chart will give a correct indication of the scenes, acts and other features of the film, as well as the audible expressions, sounds or musical selections produced at the aforesaid initial production of the combined visual and audible performance.

The finished charts which, for the purpose of this specification, may be termed "cue" charts, are thereafter distributed with the films and sound reproducing records, to the various theatres or places wherein the film and sound reproducing devices are to be utilized.

Figure 3:
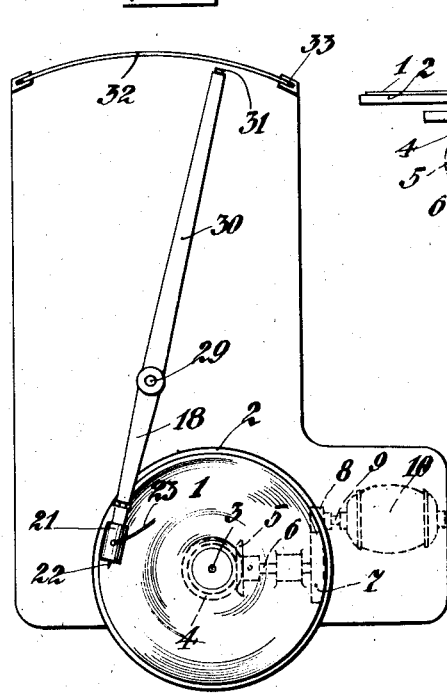
Figure 3 is a top plan view of another embodiment of my invention.
Figure 4:
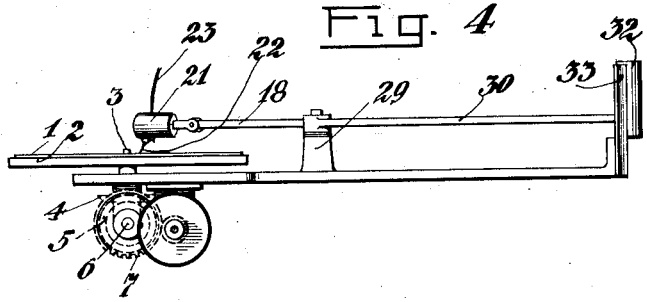
Figure 4 is a side elevational view thereof.

Referring to the embodiment of my invention shown in Figures 3 and 4, the sound reproducing apparatus comprising the disk 1 and the table 2 is driven by the motor 10 as in the first described embodiment of my invention, the motor 10 being driven in synchronized relation with the motor of the film projecting apparatus (not shown). In this embodiment of the invention, however, the arm 18 which carries the sound box 21 and the needle 22 is pivotally mounted as at 29 to a fixed support, said arm being provided with a rear extension 30 which carries an indicator 31, the latter cooperating with a curved or arc shaped chart 32 mounted in a frame 33. This indicator 31 also cooperates with a similar scale which may be provided upon a longitudinally extending rail provided upon the frame 33 as in the first described embodiment of my invention. This chart 32 is prepared in the manner identical with that which has already been described and is so positioned in its frame that the same pre-determined relative position will be maintained in the commercially utilized apparatus as obtained in the cue chart when the same was originally produced. During the operation of the machine as illustrated in this embodiment of my invention, the indicator 31 will be moved over the scale to give the desired visual indication of the pictorial representations being produced upon the screen.

As already understood, the sound reproducing apparatus and the projecting apparatus are operated in synchronism, the indicator moving automatically over the prepared chart and scale giving the desired visual indication.

If a portion of a picture film has been cut out or if for any other reason the sound reproducing mechanism is out of synchronism with the picture projection, which would be immediately indicated by the position of the pointer relative to the chart, the operator has merely to disengage the reproducer from the sound record and move the same forward or backward to the proper point, that is by adjusting the pointer relative to the chart so that the reproducer arm would be at the correct position relative to the sound record, and then re-engaging the sound reproducer with the record. By this means any portion of a sound record may be eliminated from reproduction to correspond with any eliminations that may have been made in the picture film, or where it is desired to merely eliminate certain of the sound record irrespective of whether the motion picture has been deleted or not.

It will accordingly be seen that I have provided an apparatus well adapted, to attain, among others, all the ends and objects above pointed out, in a most efficient manner.

Through the use of the device which forms one of various embodiments of my invention, the problem of maintaining a constant co-ordinance between the film features and the sound reproducing apparatus is greatly simplified. While in the present description of my invention, I have included the same as applicable to what is known as talking pictures, the same is applicable to the motion picture projecting art, wherein it is merely necessary to co-ordinate the pictorial features displayed on the film with the musical score, that is to say, screened productions wherein the audible features are limited to a playing of selections appropriate to the acts, scenes or features being portrayed on the screen.

When it is desired to provide a cue chart wherein it is necessary only to indicate the musical score, this chart is outlined at a pre-screening of the film, the observer noting on the blank chart, the various features of the screen production, to which appropriate accompanying music will be required to be played in the screened production. This cue chart will not be required to be produced simultaneously with the screening of the original film, but as above indicated can be prepared at a preview of the screening of said film.

It will be apparent that the use of my invention greatly minimizes the labor of operating apparatus now employed to synchronize a filmed production with audible expression or a musical score, and at the same time works greatly to establish and maintain more perfect co-ordination between the screened picture and the audible accompaniment thereof.

As many changes could be made in this construction without departing from the scope of the following claims, it is intended that all matter contained in the above description, or shown in the accompanying drawing, shall be interpreted as illustrative only and not in a limiting sense.

Having thus described my invention, what I claim as new and desire to secure by Letters Patent, is:—

In an apparatus of the character described, the combination of a sound reproducing machine having a disk record operated in synchronism with motion picture projecting apparatus, an indicator operatively connected with the reproducer arm of said sound reproducing machine for synchronous movement and adjustment therewith and mounted for movement over a longer range than the reproducer, and a chart having indications of the pictorial features being projected mounted on the sound reproducing machine adjacent the path of movement of and with which said indicator cooperates to give visual indication on an enlarged scale of the picture projection relative to the sound reproduction.

In testimony whereof, I hereunto affix my signature.

MICHAEL HOFFMAN.